United States Patent [19]
Crozier et al.

[11] 3,819,272
[45] June 25, 1974

[54] PROJECTIVE-REFLECTIVE OPTICAL APPARATUS

[75] Inventors: David F. Crozier, Chester Springs; Peter J. Bergman, Norristown, both of Pa.

[73] Assignee: American Manufacturing Company, Inc., King of Prussia, Pa.

[22] Filed: Mar. 29, 1973

[21] Appl. No.: 346,103

[52] U.S. Cl. ............... 356/138, 356/152, 356/153, 250/216, 250/239
[51] Int. Cl. ............................................ G01b 11/26
[58] Field of Search ............... 356/138, 152, 153; 250/216, 239; 350/202, 235, 237

[56] References Cited
UNITED STATES PATENTS

| | | | |
|---|---|---|---|
| 2,964,636 | 12/1960 | Cary | 250/216 X |
| 3,062,964 | 11/1962 | Lubin | 250/216 UX |
| 3,226,557 | 12/1965 | Goodman | 250/216 X |
| 3,628,027 | 12/1971 | Brauss | 250/216 |

*Primary Examiner*—Ronald L. Wibert
*Assistant Examiner*—Paul K. Godwin
*Attorney, Agent, or Firm*—Nelson E. Kimmelman; Maleson, Kimmelman & Ratner

[57] ABSTRACT

An integral acrylic plastic body has a forward vertical lens portion attached to a vertical, generally trapezoidal transparent section having a rear, internally reflective surface. The unit is made for screw-mounting to a circuit board or the like. It contains an upwardly extending recessed portion on its bottom edge into which a light sensor may protrude to receive light reflected from the target through the lens onto the rear, internally reflective surface. An upward projection at the rear of the trapezoidal section is provided for proper positioning of the unit relative to a light source. When the shadow of the upper edge of the projection on the external surface just behind the internal reflective surface is located at a predetermined point thereon, the light source is properly aligned.

8 Claims, 5 Drawing Figures

PATENTED JUN 25 1974 3,819,272

PROJECTIVE-REFLECTIVE OPTICAL APPARATUS

BACKGROUND OF THE INVENTION

A. Field of the Invention

This invention relates to optical apparatus and in particular to a retro-reflective optical device for use in a retro-reflective light control system which is used, together with the electronic circuitry, for various counting or control applications, for example.

B. Prior Art

Systems are known in which light is projected from a source onto a remote reflective or retro-reflective target, is then reflected back toward the projector and at least part of the reflected light is directed onto a light sensor which converts the received light into signals. They are used for any of a number of possible applications such as counting objects as they pass on an assembly or line, controlling the operation of elevator doors, etc.

Some conventional systems, known as "coaxial" systems do mount the light sensor directly behind or onto the lens between the lens and the light source. However, it is evident that such systems are much more susceptible to receiving spurious light signals due to the passage of unwanted reflected or ambient light through the lens onto the light sensor.

Other known systems have used a number of discrete elements such as a separate lens, a separate mirror, fully or partially silvered, a separate light-source and a separate light sensor. Some of these have made use of a fully-silvered mirror positioned between the lens and the light source to reflect part of the reflected light off-axis to a detector vertically spaced from it. Others have included half-silvered mirrors between the detector and the lens to reflect light from the off-axis light source through the lens onto the target. It then is reflected back through the lens and passes through the half-silvered mirror straight to the detector. These mirror systems have the advantage of tending to reject unwanted extraneous or ambient light more than coaxial systems and to utilize only the light reflected from the target. They have the concomitant disadvantage of requiring precise alignment of the various optical components with one another.

It is therefore one of the objects of the present invention to provide a projective-reflective optical apparatus for use in light control systems wherein there is permanent, built-in alignment and spacing of the lens and reflective elements thereof. It is also one of the objects to provide apparatus of the type described wherein different light sources may be easily substituted for one another and easily adjusted for proper optical alignment with the other optical elements. It is a further object of the invention to provide apparatus of the type described which is considerably less expensive to produce and/or assemble than has previously been the case. Also, it is an object of the present invention to provide apparatus of the type described which is particularly suited for combination with circuit boards and the like.

SUMMARY OF THE INVENTION

Optical apparatus formed integrally of a transparent plastic material having a forward, light-projecting portion and an inclined reflective surface behind said forward portion and optically aligned therewith for reflecting light received through said forward portion to light utilization means.

DETAILED DESCRIPTION OF THE DRAWINGS

Figure 1:
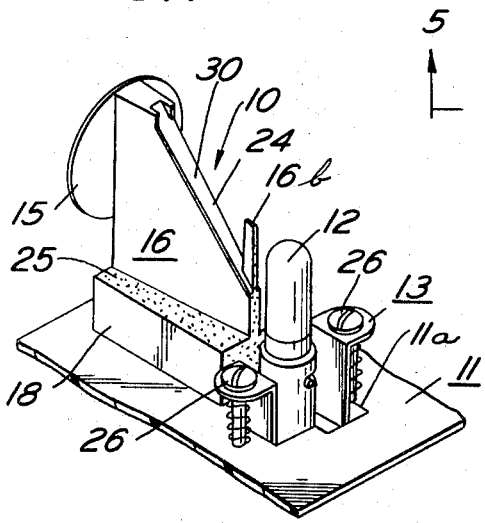
FIG. 1 is a perspective view of the apparatus according to the present invention shown mounted in a typical environment.
Figure 3:
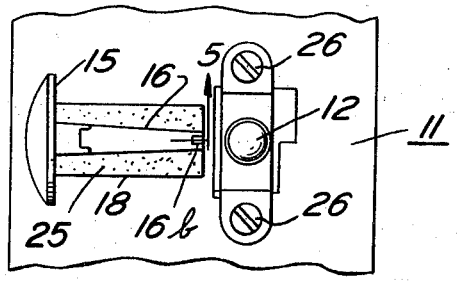
FIG. 3 is a plan view of the apparatus shown in FIG. 1.
Figure 2:
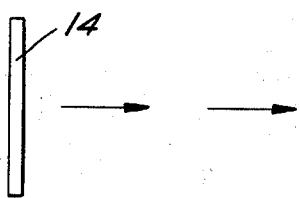
FIG. 2 is a side elevation of the apparatus shown in FIG. 1.
Figure 2:
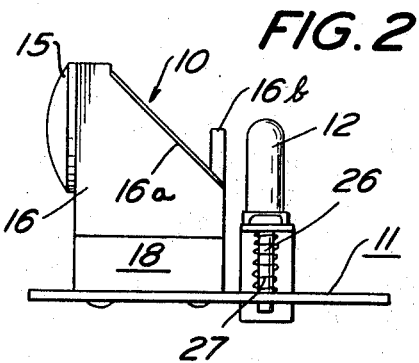
Figure 4:
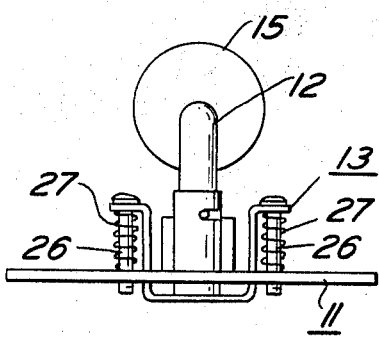
FIG. 4 is a rear elevation view of the apparatus shown in FIG. 1.
Figure 5:
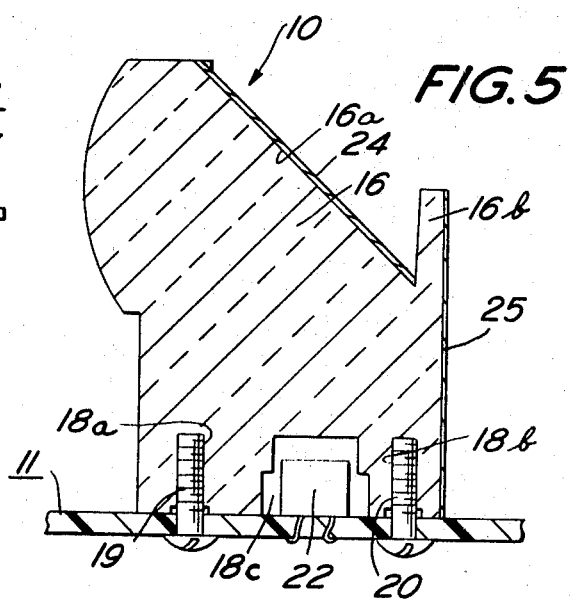
FIG. 5 is a sectional view taken along the section line 5—5 in FIG. 3 in the direction indicated.

Referring to FIGS. 1–5, there is shown generally at the numeral 10 the integral projective-reflective apparatus according to the present invention mounted on a board such as a printed circuit board 11 together with a light source 12 that is, itself, mounted in an adjustable positioning bracket indicated generally at the numeral 13. The apparatus 10 is made of a single piece of transparent, optical grade acrylic plastic having a forward focusing lens 15 which is integral with the generally trapezoidal intermediate portion 16. The intermediate portion 16 has an inclined, internally reflective surface 16a and a base 18 having a plurality of vertical threaded apertures 18a drilled upward from its bottom into which screws 19 and 20 are threaded after passing through the appropriate apertures in the board 11. The base 18 is also provided with an upwardly-extending recessed portion 18c into which a light sensor such as a photo-transistor 22 extends from or through the board 11.

The light sensor 22 may be, for example, photo-transistor OP632 made by the Optron Company which has a very small top lens that helps in reducing reception of unwanted ambient light. The outer surface of portion 16 behind the internally reflective surface 16a is covered with an opaque material 24 such as fish paper, for example, shaped as shown. This prevents light from the bulb or other ambient sources 12 from passing the internally reflective surface 16a from behind. The fish paper 24 is relatively stiff and can be stamped out to facilitate its production. Likewise, the sides shown stippled 25 are preferably painted with a flat black lacquer as is the front surface (not shown) below the lens 15. This also prevents ambient or extraneous light from sources other than the target from generating spurious light signals which in turn would cause production of false electrical signals by the photo-transistor 22.

The light source 12 is placed in the adjustable bracket 13 which is adjustably mounted with bolts 26 and springs 27 in the opening 11a in board 11. The bulb may be, as shown, of the bayonet-mount type and its upward and downward position, as well as some lateral variation, is effected by turning the bolts 26. In order to facilitate replacement of the light source when it is burnt out, there is a projection 16b formed integrally in the rear of portion 16 between the source 12 and the fish paper 24. The purpose of this projection is to provide, with respect to the initially used bulb 12, a reference point for substitution of subsequent light sources. When the original light source is inserted into its mount and the position of the bracket 13 is adjusted so that the bulb's filament is precisely at the focal point, the top edge of the projection 16b is shadowed on the fish paper 24 and a visible spot 30 is placed to mark it. Therefore, when substitute bulbs 12 are later inserted, the bracket 13 need be adjusted only until the top of the shadow again coincides with the spot 30. This adjustment is the only one required since the proper spacing and angular orientation of the lens to the reflective surface are permanently fixed by virtue of the integral construction of the unit 10.

In operation, light from bulb 12 passes on both sides of the intermediate portion 16 out through the left and right sides of lens 15 (but not through the vertical diameter region thereof) out to the reflective target 14. The target 14 may be any of the conventional types such as an acrylic plastic device or retro-reflective tape No. 7800 made by the 3M Company. It is then reflected back through the vertical diameter region of the lens onto reflected surface 16a whence it is reflected vertically downward through portion 16 onto the lens of the photo-transistor 22 which converts it into an electrical value that is used for the desired purpose.

The invention is capable of being embodied in other forms. It is obvious that the dimensions, and relative positions of the lens and reflective surface sections may be altered to particular design requirements. It is also possible to add additional reflective surfaces. At close distances to the target, there is more linear reflection so that two additional reflective surfaces could be mounted on each side of the central portion to increase the light efficiency of the device. In addition, either or both of the light source and light sensor can be mounted directly on or in the body of the plastic device, if desired. Similarly, other methods of mounting the device on boards or other surfaces are possible.

Still other modifications of the apparatus illustrated, which do not depart from the essence of the invention, may occur to one skilled in the art upon perusing the specification and drawings herein. Consequently, this invention should be limited solely by the claims which follow.

I claim:

1. A light projection and receiving apparatus for use with a light source, comprising:

a. a light receiving body having an inclined reflective surface arranged on an optical axis, said body having a light transmissive path extending through it from the front thereof along said optical axis to said reflective surface where it is deflected, b. a light-focusing means fixed to the front of said body and being aligned with said reflective surface on said optical axis, and c. light blocking means associated with said reflective surface for preventing a portion of forwardly directed light from a rearwardly located light source from passing forward through said body.

2. The apparatus according to claim 1 wherein said body is a solid body and said light-focusing means is a lens fixed to the front surface of said solid body.

3. The apparatus according to claim 2 wherein said body and said lens are integrally formed of the same material.

4. The apparatus according to claim 3 wherein said material is plastic and said reflective surface is an internal surface.

5. The apparatus according to claim 1 wherein said body and said focussing means are adapted to be brought into alignment with said rearwardly located light source, wherein said body includes a light interrupting means between said light source and said light blocking means adapted to be placed in the path of said light source whereupon said light interrupting means casts a shadow on said light blocking means, and wherein said light blocking means includes a visible mark for enabling said alignment with said light source to be made by registering said shadow on said mark.

6. The apparatus according to claim 1 wherein said body has a recessed portion in which a light sensing device may be disposed to receive light reflected from said inclined surface.

7. The apparatus according to claim 1 wherein said body has a generally trapezoidal cross-section and wherein said reflecting surface is an uncoated, internal surface of said body.

8. The apparatus according to claim 2 with the addition of adjustable means behind said reflective surface for mounting said light source at the proper position relative to said optical axis.

* * * * *